United States Patent [19]

Amort

[11] 4,025,069

[45] May 24, 1977

[54] APPARATUS FOR AUTOMATIC MICROPHOTOGRAPHY

[75] Inventor: Andrew L. Amort, Ann Arbor, Mich.

[73] Assignee: Xerox Corporation, Stamford, Conn.

[22] Filed: Mar. 25, 1975

[21] Appl. No.: 561,969

Related U.S. Application Data

[62] Division of Ser. No. 526,250, Nov. 22, 1974, Pat. No. 3,947,118.

[52] U.S. Cl. .............................. 271/147; 271/30 R; 271/222
[51] Int. Cl.² ...................... B65H 1/04; B65H 31/34
[58] Field of Search .......... 271/221, 222, 146, 145, 271/30 R, 31, 227, 147, 171, 223, 224, 250; 214/65

[56] References Cited

UNITED STATES PATENTS

| | | | |
|---|---|---|---|
| 1,554,590 | 9/1925 | McGarvin | 271/222 |
| 2,626,147 | 1/1953 | Gjostein | 271/222 X |
| 3,908,980 | 9/1975 | Fowler | 271/250 X |

FOREIGN PATENTS OR APPLICATIONS 919,619   2/1963   United Kingdom ............... 271/221

*Primary Examiner*—Johnny D. Cherry
*Assistant Examiner*—Bruce H. Stoner, Jr.

[57] ABSTRACT

An apparatus for straightening a stack of cards is disclosed. The apparatus includes a frame, an arm pivotally secured to the frame at one end thereof, a spring biasing the arm away from the stack of cards, a leaf spring secured at one end thereof to the arm near the pivoted end resiliently biased toward the stack of cards, a backstop secured to the frame, and a solenoid that can be actuated to project the arm toward the stack of cards so that the leaf spring presses against the stack of cards and also to urge the upper most cards in the stack against the backstop.

1 Claim, 4 Drawing Figures

APPARATUS FOR AUTOMATIC MICROPHOTOGRAPHY

This is a continuation, division, of application Ser. No. 526,250 filed Nov. 22, 1974, now U.S. Pat. No. 3,947,118.

The present invention relates to a microfilm apparatus and more particularly to a microfilm apparatus which automatically feeds and photographs a plurality of documents or cards, for example, library cards, index cards or the like.

BACKGROUND OF THE INVENTION

Due to the proliferation of information that has become necessary for and available to business and government, it has become advantageous to reduce the physical volume that certain forms of information occupy. For example, it may be particularly advantageous to preserve the information normally contained on index cards, individual pages of books, library cards or the like in a microfilm format. In this way, it is possible to store the information in a manner which is reproducible for subsequent viewing and which enables subsequent reproduction for the information by duplicating the original cards from the microfilm negatives. The present invention provides an apparatus whereby a plurality of original index cards or library cards or the like may be microphotographed automatically. The particular advantages of such a system would of course include the automatic rapid information retrieval of the information stored in the negatives as well as large savings in space that microphotograph negatives enjoy relative to the original cards. This of course minimizes the volume required to store the information which was originally contained on those cards. This is especially true in this invention where several cards are photographed simultaneously so that one frame of a microphotograph may contain the images of several cards.

Since it is desirable to photograph several cards at one time and since heretofore cards and pages of books have generally been manually arranged in the format in which they are to be photographed, an automatic means for arranging and spacing of the cards from each other has long been needed. Of course, where cards are automatically photographed in a desired sequence, it is also important that the desired sequence be preserved by an automatic filming machine both before and after photographing the cards to maintain file integrity.

Accordingly, one object of the present invention is to provide an apparatus adapted to photograph a plurality of cards on a single negative.

Another object of the present invention is to provide an apparatus which automatically arranges cards within a frame to be photographed.

It is another object of the present invention to provide a means for maintaining file integrity of the card file which is automatically photographed.

Yet another object is to provide means for determining the number of cards to be photographed at one time.

An object of the present invention is to also provide a means for selecting the spacing between individual cards of the frame to be photographed.

It is an object of the present invention to provide means for holding the cards flat and immovable in the focusing plane of the camera while being arranged and photographed.

It is an object of the present invention to provide means of aligning cards in a stack to sense the height of the cards in the stack and adjust the height relative to a card feeder.

SUMMARY OF THE INVENTION

The above objects and others are accomplished in accordance with this invention, generally speaking by providing an automatic apparatus associated with a camera having a means for transferring the top cards from a stack thereof one after the other to an endless belt in response to a command signal, means for charging the cards with static electricity so it will lie flat and move with the belt without slippage, means for delaying the feeding of a subsequent card to provide uniform adjustable spacing between cards, means for automatically photographing a predetermined number of the spaced cards on microfilm and means for removing the cards from the belt and stacking them again in the same order as they were in when placed on the stack before they were microphotographed.

BRIEF DESCRIPTION OF THE DRAWINGS

The invention, together with further advantages and objects thereof, may be better understood by reference to the accompanying drawings in which.

DESCRIPTION OF THE PREFERRED EMBODIMENT

Before describing the operation of the filming apparatus of the invention, the various structural features thereof will first be described.

Figure 1:
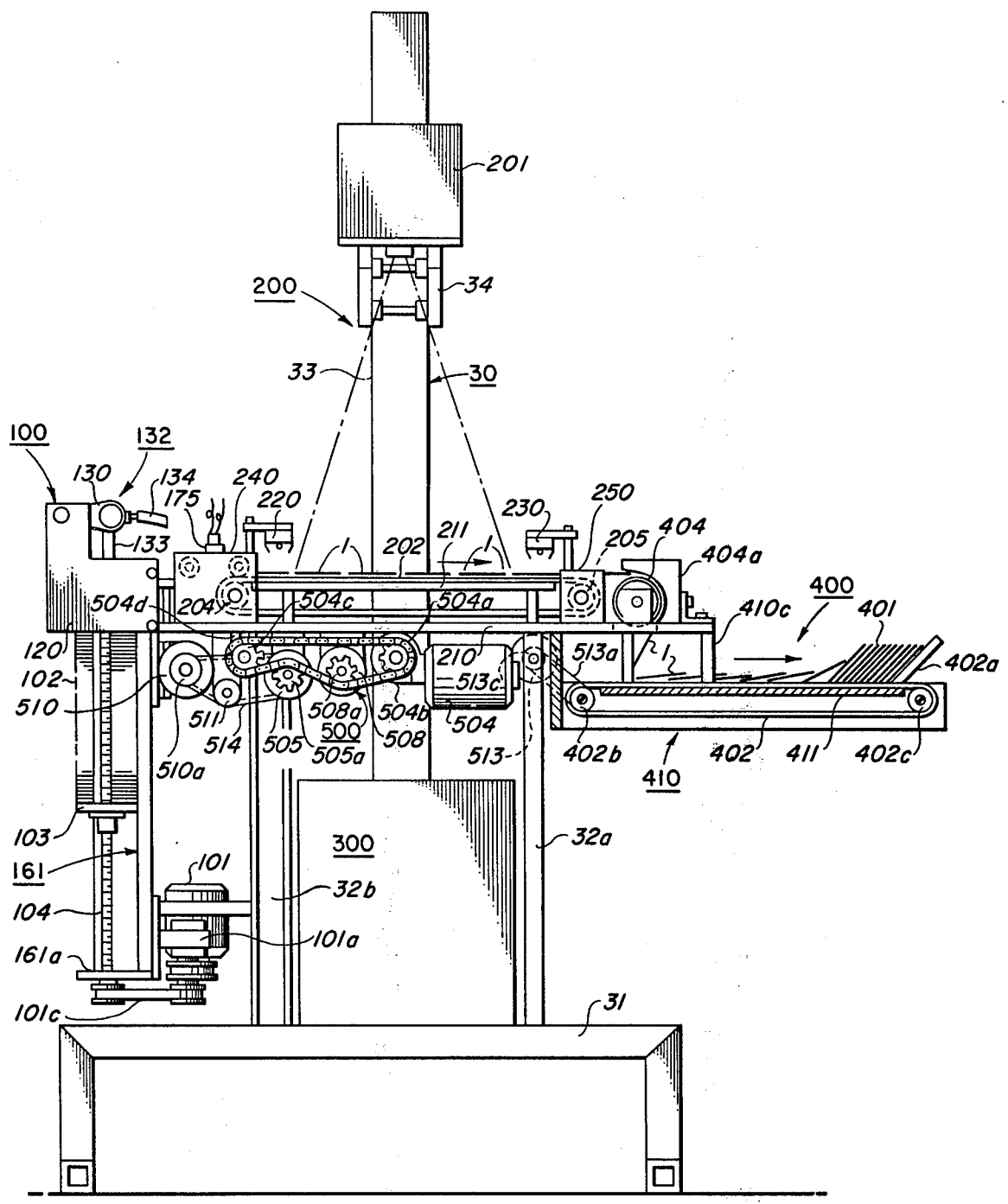
FIG. 1 shows a side elevational view of the automatic card photographing system.
Figure 2:
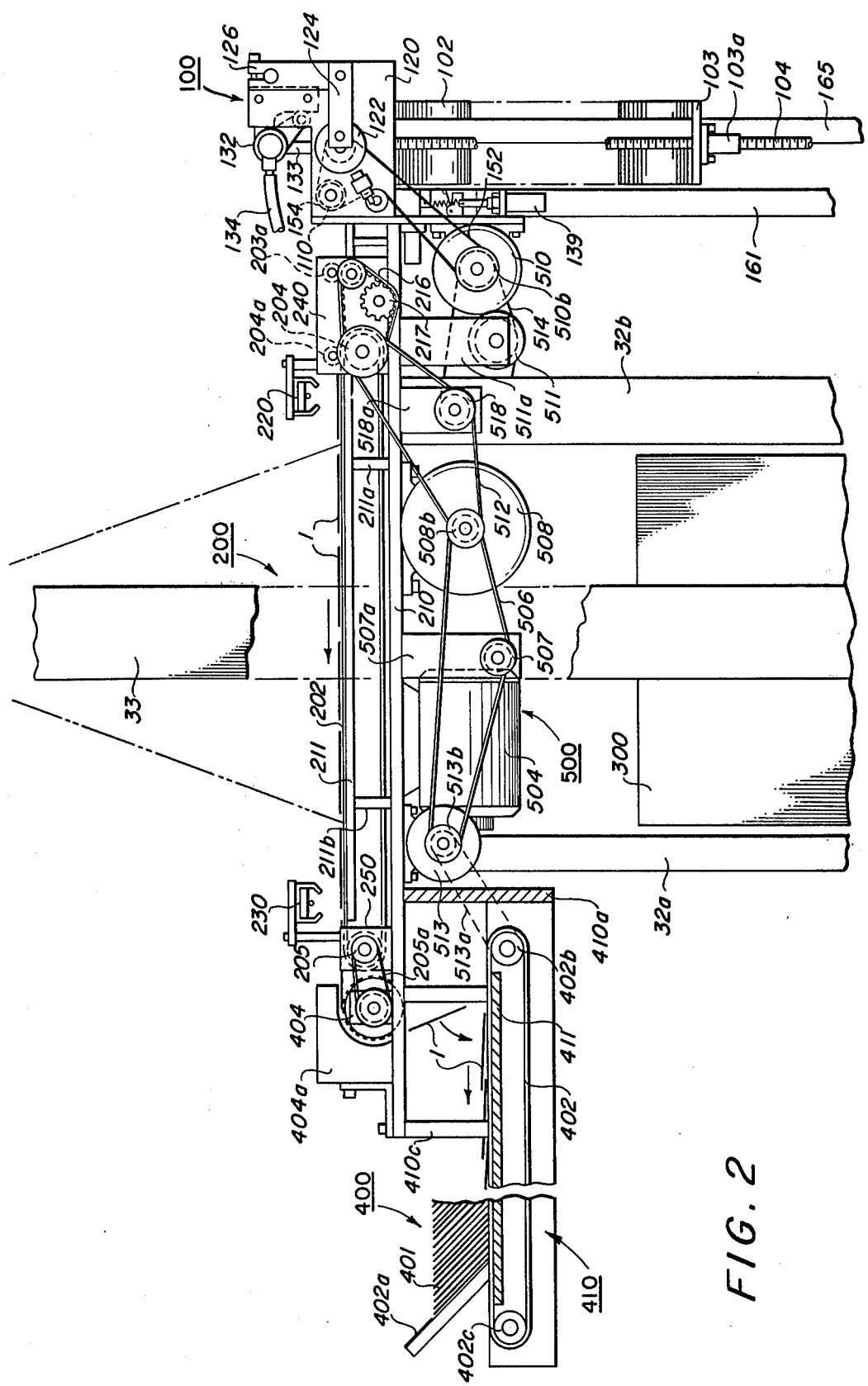
FIG. 2 is an enlarged side elevational view of the side opposite to that shown in FIG. 1.

FIGS. 1 and 2 illustrate the general overall configuration of the apparatus for automatic microphotography. In the representation of the apparatus in this specification, the numbers used indicate where various parts may be found. That is, numbers between 200 and 300 indicate parts belonging to a photographing section of the apparatus, parts between 100 and 200 belong to a mechanism for feeding cards, parts between 400 and 500 belong to a mechanism for receiving cards after they have been photographed and parts between 500 and 600 belong to a mechanism for supplying and transmitting motive power to the moving parts of the various mechanisms. In the drawings a general photographing section 200 is found in the upper center, with motive power section 500 disposed directly below the photography section 200. The photography section includes a camera 201, a belt 202 whereon the cards are photographed and associated mechanisms for advancing, arranging and photographing a plurality of cards. Feed mechanism 100 includes those parts utilized to remove individul cards from a stack of cards 102 and advance them to a belt 202. The feed mechanism 100 is found at the left of FIG. 1 and the right of FIG. 2. A card receiving mechanism 400 which is utilized to receive cards after they have been photographed on the belt 202 and maintain them in the order in which they were stacked in stack 102 is provided to the right of FIG. 1 and to the left in FIG. 2. An electronics package 300 is found centrally disposed beneath the motive power mechanism 500. The package 300 shown generally in FIG. 1 and FIG. 2 contains an electronic control system which regulates the automatic operation of the overall apparatus.

The apparatus has an overall supporting frame 30 to which camera 201 as well as various subframes are attached.

The frame 30 includes a base 31, upright struts 32a and 32b and camera support 33. Camera support 33, by means of a height adjustment mechanism 34 retains the camera 201 in vertically adjustable relationship directly over belt 202.

The photography section 200 includes belt 202 located in the focusing plane of camera 201, and section 200 is provided with a horizontal planar subframe 210 disposed beneath belt 202 and operative to support various components of section 200. Horizontal planar subframe 210 is disposed below the camera and attached to frame 30 and bears supports 240 and 250 near the opposite ends of belt 202 as well as plate 211. The belt 202 is looped about a pair of longitudinally spaced rollers 204 and 205 supported by means 240 and 250 in bearings. Plate 211 supports the upper reach of the belt 202 and is used to keep the belt flat in the focusing plane for the camera. Plate 211 is attached to subframe 210 by means of struts 211a and 211b. Belt 202 thus provides a flat plane to support individual cards 1 to be photographed. The cards 1 are held down on the belt 202 by electrostatic forces generated by a corotron 220 secured to support 240. The belt preferably should have a surface which enables charged cards to electrostatically adhere thereto. A teflon, or polytetrafluoroethylene, surface is an example of such a surface.

Cards are fed to the belt by a feed apparatus generally indicated by number 100, as shown at the right of FIG. 2 and the left of FIG. 1. The cards 1 are stored prior to being photographed in a stack 102 which is supported by a platform 103. Subframe 161, attached to subframe 210, supports threaded rods 104 rotatably secured at the bottom of the feed apparatus 100 by bearings in a support 161a and at the top by bearings in a housing 120. The threaded rods 104 support platform 103 and provide a means whereby the platform may be elevated. A motive power source 101, a clutch brake 101a and a belt 101c are provided to rotate the rods 104 to elevate the platform 103 at appropriate times as determined by a control system generally shown as an electronics package 300.

The feeding mechanism also includes a suction cup pick up apparatus 132 supported by housing 120 and movably mounted thereto by cantilever members 130. This mechanism removes cards 1 from the stack 102 to transfer them via a series of rollers (to be described in detail below) to the belt 202.

Cards are removed from the belt 202, after exposure, to another stack 401 shown at the left of FIG. 2 and the right of FIG. 1. An apparatus generally shown at 400 collects the cards 1 after photographs thereof have been made. A corotron 230 is provided to discharge the photographed cards 1 on the belt to enable them to be removed to the apparatus 400.

The apparatus 400 includes a subframe 410 attached to subframe 20 by struts 410a, 410b 410c and which supports a pair of rollers 402b and 404c which rollers secure a belt 402. Belt 402 is maintained flat by means of a plate 411. An inverting means including a roller 404 and a block 404a is attached to subframe 20 and receives cards 1 between the roller 404 and the block 404a and deposits the cards 1 upside down on the belt 402.

The belt 402, which is caused to move at a slower rate than the belt 202 receives the cards in an inverted and overlapping fashion due to the slower speed. A stop plate member 402a is provided at the end of belt 402 and it is secured to frame 410. The cards are caused to butt against the stop 402a and the leading edge of the first card to contact plate 402 is caused to slide the card upward along the plate 402a as shown in FIG. 1. Because they overlap, the cards will form a stack against the plate 402a.

Motive power to run the belt 202, to operate the card receiving apparatus 400 and the feed apparatus 100 is supplied by a motive power transmission system generally indicated at 500 and disposed centrally within the overall apparatus below the belt 202. The system includes a motor 504 attached to subframe 210 which provides power for the feeding mechanism 100, for the belt 202, and for the card receiving apparatus 400.

A sprocket chain 504a is provided to transmit power from motor 504. The sprocket chain 504a is driven from motor 504 by motor output sprocket wheel 504b. An idler sprocket wheel 504c is also attached by strut 504d to subframe 210 and is provided for the chain 504a. Transmission 505 and clutch brake 508 are also attached to subframe 210 and are driven from chain 504a via their respective input sprocket wheels 505a and 508a.

A clutch brake 510 is attached to subframe 160 and is driven via transmission 505. A belt 514 connects the output of transmission 505 to the input pulley 510a of clutch brake 510. An idler pulley 511 attached to subframe 210 by strut 511a tensions belt 514. This is also illustrated in FIG. 2 which should also be referred to. Clutch brake 510, by means of belt 152 looped about the output pulley 510b, is operative to impart motion to the mechanical parts of feed mechanism 100 to feed cards in a manner described below.

The output of clutch brake 508 is taken at a pulley 508b. For purposes of driving belt 402 a gear reduction apparatus 513 is provided. A belt 506 is provided to transmit power to transmission 513 from clutch brake 508. The belt 506 is trained between output pulley 508b of clutch brake 508 and input pulley 513b of transmission 513. Idler pulley 507, attached to subframe 210 by means of strut 507a, tensions belt 506. The belt 513a is provided which transmits power from the output pulley 513c to roller 402b to drive belt 402.

A belt 512 is also provided to impart motion to belt 202. Belt 512 is trained between the output pulley 508b and roller 204. An idler pulley 518 is attached to subframe 210 by means of strut 518a and tensions belt 512.

It is to be understood that the various rollers, pulleys, and sprocket wheels described herein are to be retained in their respective struts or supports by appropriate bearings or bearing surfaces.

The apparatus for feeding the individual cards has been generally shown at 100 having a stack of cards 102 held on a platform 103. This will now be described in more detail. The platform 103 is vertically movable by means of motor driven screw threaded rods 104 so as to bring the top card 1 in proximity with a movable suction cup pick-up arm 133. This enables pick-up arm 133 to engage the upper most card 1 in the stack. When pick-up arm 133 removes a card 1 from the stack 102, it initially removes it vertically and means are provided to later move the individual card 1 horizontally. Nip rollers 110 and 110a are provided to remove the card 1 from the arm 133 when arm 133 brings the card into the nip formed between rollers 110 and 110a. A logical circuit is provided which generates a command signal to actuate the feeding mechanism and simultaneously the nip rollers 110 and 110a to move the card 1 to another set of rollers 203a and 203b. The set of rollers 203a, 203b are rotatably attached to support 240 as is roller 204; a companion roller 204a is also attached to frame 24 to form a pair of rollers 204, 204a. A belt 216 is trained between rollers 204 and 203a to impart motion to roller 203a. Roller pairs 204, 204a and 203a, b run simultaneously with belt 202 and advance a card fed by nip roller pair 110, 110a directly to the belt 202.

The feed mechanism 100 is operated from clutch brake 510 independently of belt 202 and the rollers 203a, b and 204, 204a. The rollers 110, 110a and pick-up arm 133 are driven from clutch brake 510 only by means of belt 152. Clutch brake 510 thus controls the transmittal of power from motor 504 to the feed apparatus 100. Clutch brake 510 receives this power from motor 504 by means of belt 54 as has been described. In this way the card fed to the nip rollers 110, 110a is not fed to roller pair 203a, b until a subsequent feed signal from the control circuit causes a subsequent card to be removed from the stack 102 by energizing clutch 510. The nip roller 110 is attached to a pulley 154 which is driven by belt 152. Pulleys 153, 154 and 122 are all provided to be driven by belt 152 and are rotatably secured in a housing 120.

Figure 3:
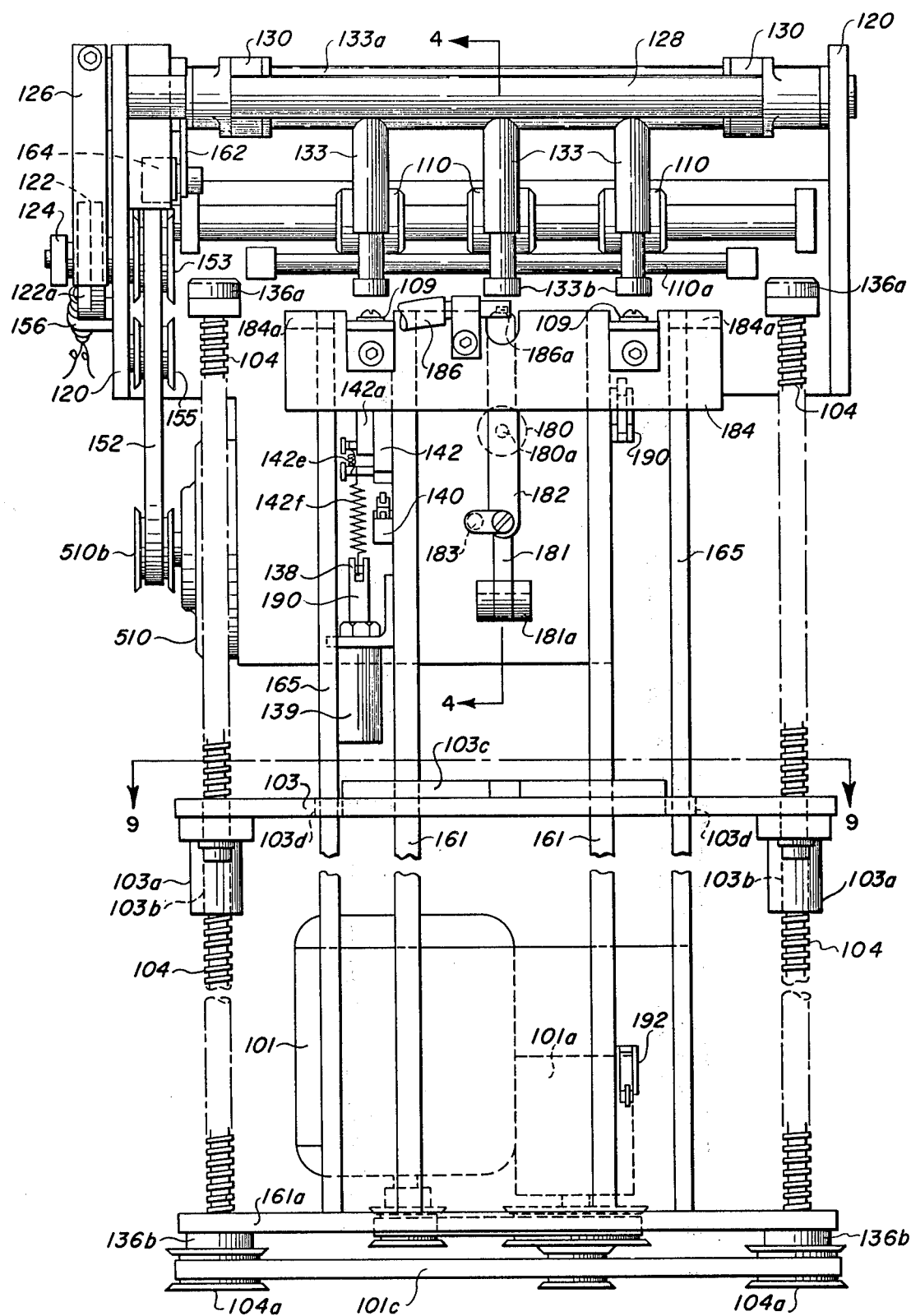
FIG. 3 is an end elevational view, showing the card feeding mechanism of the automatic card photographing system.
Figure 4:
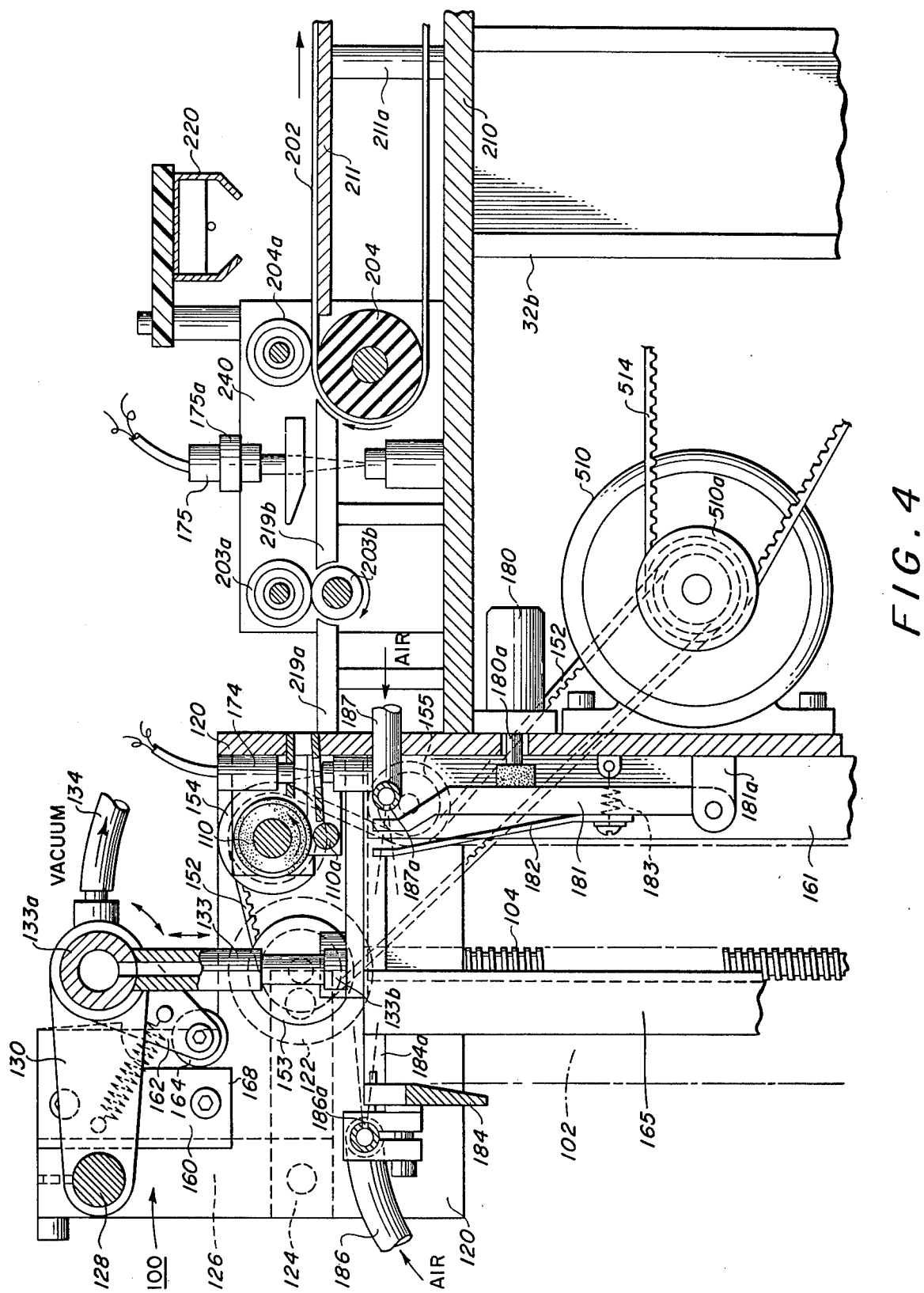
FIG. 4 is a longitudinal sectional view of the card feeding mechanism.

FIGS. 3 – 4 show more clearly the arrangement utilized for picking up and feeding individual cards. The feeding mechanism has a housing 120 having a wheel 122 rotatably mounted thereon and an eccentrically mounted push rod 124 is movably attached to wheel 122 and also to a lever 126. The lever 126 is mounted to a shaft 128 rotatably fitted in the frame 120. By means of cantilever member 130 a vacuum suction cup apparatus 132 comprising a plurality of suction cup arms 133, a manifold 133a and a vacuum line 134 are attached to a shaft 128. Vacuum may be provided from a suitable source and by means of line 134 to manifold 133a and arms 133 which are all provided with communicating passages to create a suction at cups 133b. The manifold 133a from which the suction cup arms 133 are suspended are pivotally mounted within the cantilever members 130. The suction cup arms 133 move individual cards from a stack of cards 102 which rests on pallet 103c on platform 103. The stack and platform 103 are raised by the threaded rods 104 which engage the threaded inner portion 103b of platform supports 103a. These threaded rods are turned by motor 101 in response to a signal from a sensor 138. This sensor includes a solenoid 139, a microswitch 140 and a T-shaped feeler 142. The threaded rods 104 are secured and rotatably mounted to housing 120 by bearings 136a at the top and by bearings 136b at the bottom thereof where the rods engage frame section 161a attached to frame 161.

The suction cup members 133b are provided with motive power to enable them to pick up a card from the stack by motor 504 shown in FIGS. 1 and 2. Clutch brake 510 allows the transferral of motive power upon receiving energization signals from the control circuit. Belt 152 is trained about pulleys 153, 154, and tensioning idler pulley 155 to drive wheel 122 and roller 110. Rollers 110, 110a are provided and form a nip roller for engaging individual cards upon their removal from suction cup apparatus 133. Further a photoelectric cell 156 is provided to sense the rotation of the wheel 122, a single rotation of which corresponds to the feeding of a single card. By means of masking out a portion of a reflective surface on the periphery of wheel 122, for example by black tape 122a, photoelectric cell 156 may be de-energized. In this manner, a signal may be developed in the cell 156 indicative of one rotation of wheel 122 corresponding to the feeding of a single card. This signal may be utilized to actuate a mechanism to straighten the stack of cards 102. Such a mechanism is provided by this invention and is further illustrated in more detail in FIGS. 3 and 4. The signal provided by sensor 156 may be also utilized to energize the brake of clutch brake 510 at an appropriate point during the feed cycle.

Also provided are rollers 201a and 203b rotatably mounted in support 240 which advance a card from the nip roller 110 and 110a to the belt 202. By means of belt 216, as well as idler wheel 217, the motion of roller 204 is both utilized to drive belt 202 as well as the rollers 203a and 203b. Clutch brake 508, by means of belt 512 and idler 518 controls the motion of roller 204, and when energized causes the belt 202 to move. Belt 506 is driven through clutch brake 508, and has a tensioning idler 207. Belt 506 drives the gear reduction unit 513 shown in FIG. 1 and 2. Hence, the operation of the brake portion of unit 508 stops both belt 202 and belt 402 at the appropriate time as determined by the control circuit. Power input to clutch brake 508, though not shown in complete detail in FIG. 2, is obtained from motor 504 by means of sprocket chain 504a which is shown in FIG. 1.

Upon energization of the clutch brake 510 by the control circuit the clutch is actuated to impart rotational motion to the wheel 122 by means of belt 152. This rotation displaces push rod 124 and lever 126. By moving push rod 124 and lever 126 the suction arms 133 suspended from cantilever 130 are initially moved vertically downward sufficient to contact a single card as they pivot about shaft 128. As the wheel 122 turns further, suction cups 133b, which now have a card attached thereto, are raised vertically. A cam roller 164 mounted on arm 162 which is fixed to the suction cup manifold 133a, cam 160 mounted to the frame 120 and cam surface 168 on cam 160 are provided. Cam roller 164 contacts surface 168 so that cam 160 and roller 164 cause the suction assembly 132 to move horizontally when a certain vertical height has been reached by the suction cup 133b. Thus, the card carried by the suction cup engages the nip roller 110 and 110a for advancing the card to the belt 202. The nip rollers 110 and 110a are also rotated by belt 152 in the same direction as the horizontal direction imparted by the cam to the suction assembly 133.

The rollers 110 and 110a are rotated via belt 152. Roller 110 is rotated by means of an associated pulley 154 about which belt 152 is looped and is attached to roller 110. Roller 110a rotates due to frictional engagement with roller 110 or with a card 1 held in the nip between rollers 110, 110a. The size of the rollers may be selected so that the rollers 110 and 110a rotate at the same relative speed as the horizontal motion of the suction cups 133b and in the proper direction to remove the card therefrom.

The operation of the feeding apparatus is such that the speed of feeding the card to the nip roller 110 and the velocity achieved by the card through the nip roller 110 is substantially faster than the speed of a card moving along the belt 202. The feeding speed may be adjusted by selecting the diameter of an appropriate pulley such as wheel 122. This enables the cards fed to the nip rollers 110 and 110a to be stopped and the feeding mechanism to come to a halt before the card is required to be fed to the belt 202. This is important in the achievement of relative spacing between the cards and hence will be described in detail below. Card support bars 219a and 219b are attached to subframe 210 and they span the spaces between housing 120 and rollers 203a, b and between rollers 203a, 203b and rollers 204a, 204b, and are used to support and align the cards 1 to enable them to be properly fed from rollers 110, 110a to rollers 203a, b, to rollers 204, 204a and to belt 202.

FIG. 3 also shows the provision of two limit switches 190 and 192 at the upper and lower ends of travel of platform 103. These switches engage the platform 103 at two positions and correspond to the extreme bounds of travel for the platform 103. For example, when the platform engages switch 190 both the motive power to raise the platform as well as the power to feed the cards is interrupted by the system since this position corresponds to the exhaustion of a supply of cards in the stack supported by the platform. On the other hand, if the platform is caused to contact limit switch 192, both the clutch 101a and the motor 101 itself are de-energized.

FIG. 4 shows the apparatus as described and shown in FIGS. 2 and 3 from the opposite side of FIG. 2 and in somewhat greater detail. FIG. 4 shows a stack of cards 102 the uppermost card of which is to be contacted by the suction cups 133b. As in FIG. 2, suction cup apparatus 133 are shown, and as they are vertically displaced, and as has been described, the suction cups remove a card from the stack 102 and insert it in the nip rollers 110 and 110a. When another card is removed, the card in the nip rollers is advanced to the next pair of rollers 203 and 203a. Photoelectric cells 174 and 175 are provided between roller pairs 110, 110a and 203o, 203b and between roller pairs 203a, 203and 204, 204a respectively, and sense the presence or absence of the cards at appropriate positions. Cell 174 senses a card fed to the nip rollers 110 and 110a and cell 175 register a card to be passed to the belt 202. Photoelectric cell 175 is also useful for applying a signal to an electric counter circuit included in the control circuit described below for counting the number of cards fed to the belt 202 so that after a predetermined number of cards are fed a photograph may be made. Both the photoelectric cells 174 and 175 sense the position of the cards 1. Cell 175 forms a means for locating the position of cards 1 relative to each other so that a constant space is maintained between them. Cell 174 sense whether a card was missed by the feeding mechanism and is operative to stop the feeding of subsequent cards. Each card 1 will thus have a definite location on the belt 202 and hence in the photograph.

Thus, depending on the position of the card as sensed by cell 175, the feeding of a card may be delayed an appropriate amount for the proper spacing between the predetermined number of cards to be photographed on the belt 202.

FIGS. 1, and 2, also show the position of corotrons 220 and 230 above belt 202. Corotron 220 is used to electrostatically charge each card as it emerges from roller pair 204 and 204a and is positioned close thereto so that each card is fully charged and thus adheres to the belt 202 when it is released by rollers 204 and 204a. Corotron 230 near the roller 205 is utilized to discharge the cards to enable them to be removed from the belt 202 by the card inverting apparatus 404.

FIGS. 3 and 4 also show apparatus for straightening the cards in the stack 102 disposed directly below rollers 110, 110a and adjacent the stack 102. The apparatus includes a solenoid 180, a lever arm 181 and a spring member 102 attached to the above arm 181. The arm is attached pivotally to housing 120 by pivot block 181a and is biased by spring 183 away from the stack. A back stop plate 184 is disposed next to a side of the stack 102 opposite to the arm 181. Plate 184 is attached to housing 120 by struts 184a. Piston 180a attached to the solenoid 180 is utilized to bring spring 182 into contact with the stack for straightening the cards and to push them against the back stop plate 184. A nozzle 186 having an aperture 186a to blow air into the stack so that the uppermost cards in the stack are easily removed. The nozzle 186 is attached to plate 184. The uppermost cards in the stack are separated in this manner. Nozzle 187 and aperture 187a perform in the same manner and are attached to housing 120 opposite to the nozzle 186. Solenoid 180 is energized during every feed cycle as has been described above, that is, it is actuated by the photocell unit 156 as shown in FIG. 2 in conjunction with a blacked-out portion on wheel 122. At such time that suction cup 133 has reached its maximum downward stroke to engage the card and a photocell of unit 156 encounters a blacked-out portion of wheel 122, solenoid 180 is actuated to move arm 181 and spring 182 to straighten the stack of cards between plate 184 and the spring 182. This also gives each card edge a reference point, that is, plate 184 from where it is fed to enable the proper registration and spacing of the cards.

While an embodiment of the invention has been shown and described in detail, it will be understood that various changes and modifications may occur to those skilled in the art without departing from the spirit and scope of the present invention as defined in the appended claims.

What is claimed is:

1. An apparatus for straightening a stack of cards comprising:
   a frame;
   an arm pivotally secured to said frame at one end thereof;
   a spring biasing said arm away from said stack;
   a leaf spring secured at one end thereof to said arm near said pivoted end and resiliently biased toward said stack;
   a backstop secured to said frame;
   a solenoid actuatable to pivot said arm toward said stack so that said leaf spring presses against said stack and to urge the uppermost cards in the stack against the backstop;
   means for removal of a card from the stack;
   a drive mechanism for driving said means;
   means on said drive mechanism for providing a periodic signal; and
   means responding to said periodic signal for periodically energizing the solenoid.

* * * * *